(12) United States Patent
Abchuyeh et al.

(10) Patent No.: US 8,948,157 B2
(45) Date of Patent: Feb. 3, 2015

(54) METHOD AND APPARATUS FOR DISTRIBUTED SYNCHRONIZATION IN FEMTOCELL NETWORKS

(75) Inventors: Marjan Baghaie Abchuyeh, Bridgewater, NJ (US); Samel Celebi, Summit, NJ (US); Luca Blessent, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 13/605,887

(22) Filed: Sep. 6, 2012

(65) Prior Publication Data

US 2013/0242861 A1 Sep. 19, 2013

Related U.S. Application Data

(60) Provisional application No. 61/532,021, filed on Sep. 7, 2011, provisional application No. 61/533,739, filed on Sep. 12, 2011.

(51) Int. Cl.
  *H04J 3/06* (2006.01)
  *H04W 4/00* (2009.01)
  *H04W 56/00* (2009.01)

(52) U.S. Cl.
  CPC .......... *H04W 56/001* (2013.01); *H04J 3/0638* (2013.01); *H04W 56/0015* (2013.01)
  USPC .......................................... 370/350; 370/329

(58) Field of Classification Search
  CPC .......... H04W 56/0055; H04W 56/001; H04W 56/00; H04W 56/0035; H04W 56/003
  USPC ......... 370/350, 329, 330, 344, 343, 319, 431, 370/503, 510; 455/524, 525, 522, 132–135, 455/115.1, 115.3, 226.1, 422.1, 452.1, 450
  See application file for complete search history.

(56) References Cited

U.S. PATENT DOCUMENTS

| 8,145,247 | B2 | 3/2012 | Fullam | |
|---|---|---|---|---|
| 8,248,915 | B2 * | 8/2012 | Baglin et al. | 370/217 |
| 2009/0097452 | A1 | 4/2009 | Gogic | |
| 2009/0225743 | A1 | 9/2009 | Nicholls et al. | |

(Continued)

FOREIGN PATENT DOCUMENTS

| EP | 2410797 A1 | 1/2012 |
|---|---|---|
| GB | 2469309 A | 10/2010 |
| WO | 2010105488 A1 | 9/2010 |

OTHER PUBLICATIONS

International Search Report and Written Opinion—PCT/US2012/054314—ISA/EPO—Apr. 17, 2013.

(Continued)

*Primary Examiner* — Hanh N Nguyen
(74) *Attorney, Agent, or Firm* — Fariba Yadegar-Bandari

(57) ABSTRACT

Aspects disclosed herein relate to facilitating synchronizing frequency and/or timing of a wireless network. In an example, with a femto node configured to receive one or more signals from one or more anchor sources, determine that at least one of the one or more signals are received at least at a threshold signal quality, determine whether a difference in a local frequency and/or a local timing is within a threshold difference to a signal frequency and/or a signal timing determined based on the at least one of the one or more signals, and advertise an anchor status where the difference is within the threshold difference.

40 Claims, 12 Drawing Sheets

(56) References Cited

U.S. PATENT DOCUMENTS

| | | | |
|---|---|---|---|
| 2010/0046494 A1 | 2/2010 | Palanki et al. | |
| 2011/0275402 A1* | 11/2011 | Charipadi et al. | 455/522 |
| 2011/0281574 A1* | 11/2011 | Patel et al. | 455/422.1 |
| 2012/0094652 A1 | 4/2012 | Kilgour | |
| 2012/0115496 A1* | 5/2012 | Soliman et al. | 455/452.1 |

OTHER PUBLICATIONS

Partial International Search Report—PCT/US2012/054314—ISA/EPO—Nov. 23, 2012.

* cited by examiner

METHOD AND APPARATUS FOR DISTRIBUTED SYNCHRONIZATION IN FEMTOCELL NETWORKS

CLAIM OF PRIORITY UNDER 35 U.S.C. §119

The present application for patent claims priority to Provisional Application No. 61/532,021 entitled "DISTRIBUTED SYNCHRONIZATION FOR FEMTOCELL NETWORKS" filed Sep. 7, 2011, and Provisional Application No. 61/533,739 entitled "METHOD AND APPARATUS FOR DISTRIBUTED SYNCHRONIZATION IN FEMTOCELL NETWORKS" filed Sep. 12, 2011, and assigned to the assignee hereof and hereby expressly incorporated by reference herein.

BACKGROUND

Wireless communication systems are widely deployed to provide various types of communication content such as, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional restricted base stations can be deployed to provide more robust wireless coverage to mobile devices. For example, low power base stations (e.g., which can be commonly referred to as Home NodeBs or Home eNBs, collectively referred to as H(e)NBs, femto base stations, femtocells, picocells, microcells, etc.) can be deployed for incremental capacity growth, richer user experience, in-building or other specific geographic coverage, and/or the like. In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc. without consideration of a current network environment. Low power base stations can synchronize local frequency and/or timing with global positioning signals (GPS) or reference signals from macrocell base stations in the network, but in some cases the low power base stations may not be able to receive such signals with good signal quality (e.g., depending on the surrounding network environment), which can cause problems when decoding the signal to determine a frequency or timing to which to synchronize.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Various aspects are described in connection with facilitating synchronizing frequency and/or timing of a wireless network. In an example, with a femto node configured to receive one or more signals from one or more anchor sources, determine that at least one of the one or more signals are received at least at a threshold signal quality, determine whether a difference in a local frequency and/or a local timing is within a threshold difference to a signal frequency and/or a signal timing determined based on the at least one of the one or more signals, and advertise an anchor status where the difference is within the threshold difference.

According to related aspects, a method for facilitating synchronizing frequency and/or timing of a wireless network. The method can include receiving one or more signals from one or more anchor sources. The method may also include determining that at least one of the one or more signals are received at least at a threshold signal quality. Further, the method may include determining whether a difference in a local frequency and/or a local timing is within a threshold difference to a signal frequency and/or a signal timing determined based on the at least one of the one or more signals. Moreover, the method can include advertising an anchor status where the difference is within the threshold difference.

Another aspect relates to an apparatus synchronizing frequency and/or timing in a wireless network. The apparatus can include means for receiving one or more signals from one or more anchor sources. The apparatus can also include means for determining that at least one of the one or more signals are received at least at a threshold signal quality. Further, the apparatus can include means for determining whether a difference in a local frequency and/or a local timing is within a threshold difference to a signal frequency and/or a signal timing determined based on the at least one of the one or more signals. Moreover, the apparatus can include means for advertising an anchor status where the difference is within the threshold difference.

Another aspect relates to an apparatus for synchronizing frequency and/or timing in a wireless network. The apparatus can include at least processor configured to receive one or more signals from one or more anchor sources, determine that at least one of the one or more signals are received at least at a threshold signal quality, determine whether a difference in a local frequency and/or a local timing is within a threshold difference to a signal frequency and/or a signal timing determined based on the at least one of the one or more signals, and advertise an anchor status where the difference is within the threshold difference.

Another aspect relates to a computer program product, which can have a computer-readable medium comprising code for receiving one or more signals from one or more anchor sources determining that at least one of the one or more signals are received at least at a threshold signal quality.

The computer-readable medium can also include code for determining whether a difference in a local frequency and/or a local timing is within a threshold difference to a signal frequency and/or a signal timing determined based on the at least one of the one or more signals. Further, the computer-readable medium can include code for determining whether a difference in a local frequency and/or a local timing is within a threshold difference to a signal frequency and/or a signal timing determined based on the at least one of the one or more signals. Moreover, the computer-readable medium can include code for advertising an anchor status where the difference is within the threshold difference.

According to related aspects, a method for facilitating synchronizing frequency and/or timing of a wireless network. The method can include receiving a plurality of signals from a plurality of sources. The method may also include determining whether a source from the plurality of sources is an anchor signal source based at least in part on an indication received from the source of the plurality of signals. Moreover, the method can include determining a difference in a frequency and/or a timing between each of the plurality of signals and a local frequency and/or a local timing.

Another aspect relates to an apparatus synchronizing frequency and/or timing in a wireless network. The apparatus can include means for receiving a plurality of signals from a plurality of sources. The apparatus can also include means for determining whether a source from the plurality of sources is an anchor signal source based at least in part on an indication received from the source of the plurality of signals. Moreover, the apparatus can include means for determining a difference in a frequency and/or a timing between each of the plurality of signals and a local frequency and/or a local timing.

Another aspect relates to an apparatus for synchronizing frequency and/or timing in a wireless network. The apparatus can include at least processor configured to receive a plurality of signals from a plurality of sources, determine whether a source from the plurality of sources is an anchor signal source based at least in part on an indication received from the source of the plurality of signals, and determine a difference in a frequency and/or a timing between each of the plurality of signals and a local frequency and/or a local timing.

Another aspect relates to a computer program product, which can have a computer-readable medium comprising code for receiving a plurality of signals from a plurality of sources. The computer-readable medium can also include code for determining whether a source from the plurality of sources is an anchor signal source based at least in part on an indication received from the source of the plurality of signals. Moreover, the computer-readable medium can include code for determining a difference in a frequency and/or a timing between each of the plurality of signals and a local frequency and/or a local timing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
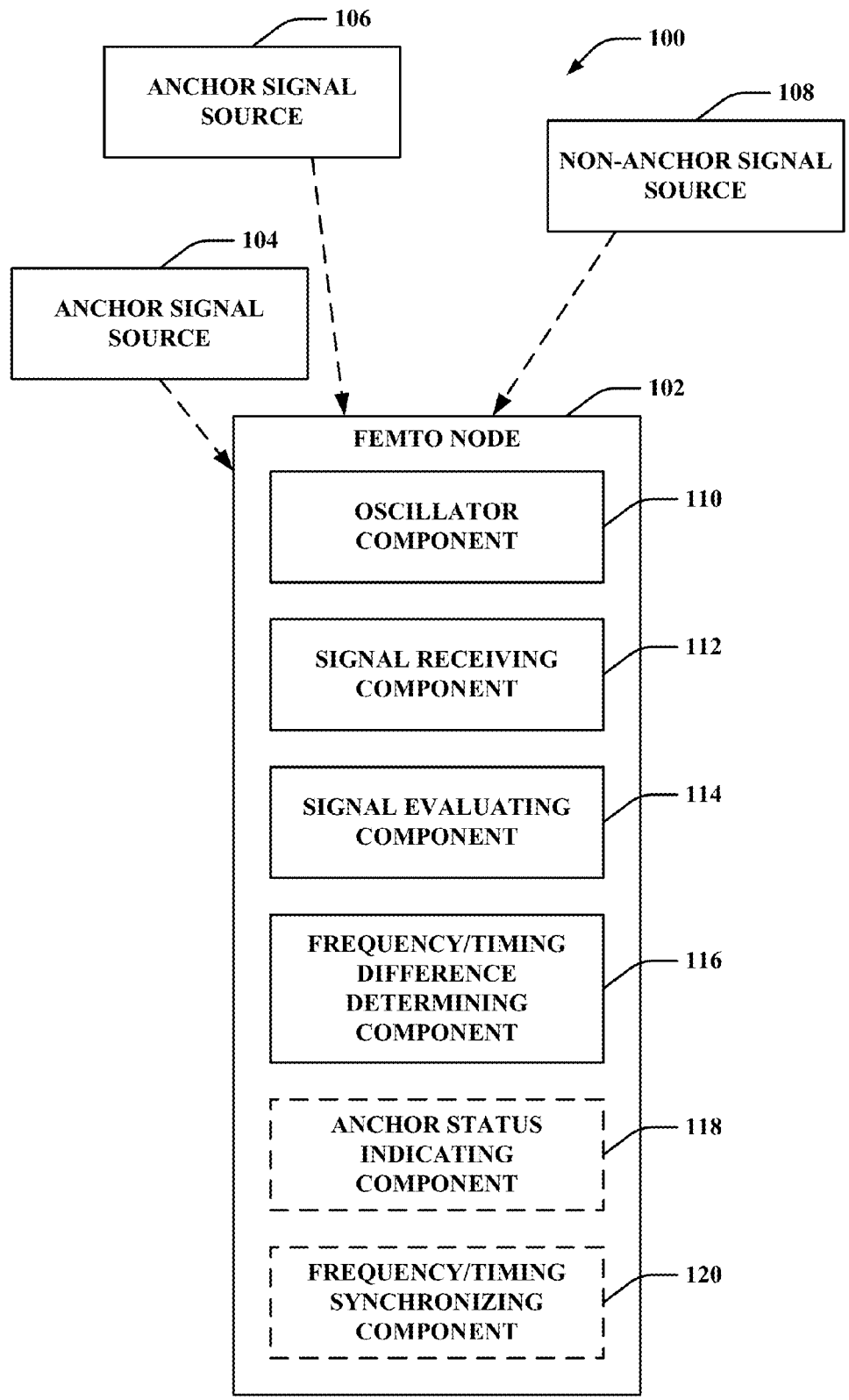
FIG. 1 is a block diagram of an example system that facilitates synchronizing frequency and/or timing of a femto node.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, low power base stations can synchronize frequency and/or timing to one or more signal sources. In one example, a low power base station can determine whether one or more anchor signals for synchronizing frequency and/or timing are received at least at a threshold signal quality. For example, anchor signals can be signals from reliable sources, such as global positioning system (GPS) signals, signals broadcast from macrocell base stations, etc., used as a reference point for synchronizing frequency and/or timing. If the anchor signals are received at the threshold signal quality, the low power base station can determine a frequency or timing difference based on the anchor signals and can determine whether the difference is within a threshold. If so, the low power base station can lock its frequency and/or timing (e.g., refrain from checking other sources or at least lessen the instances at which it checks other sources for updating) and can broadcast information specifying that the low power base station can be an anchor for other low power base stations synchronizing frequency and/or timing. If not, the low power base station can synchronize to the anchor signals.

If the one or more anchor signals are not received at the threshold signal quality (and/or the received signals are not anchor signals), the low power base station can weigh a plurality of anchor signals and/or other signals for determining a weighted average frequency and/or timing difference.

For example, the low power base station in this example can receive signals, determine frequency and/or timing difference between the signals and a local frequency and/or timing, and weigh the difference based on whether the source of the signal is an anchor or otherwise a type of the source (e.g., and/or of the signal, which can identify the source), a quality of the signal, and/or the like. In one example, a GPS signal can be given a higher weight than a signal from another low power base station, and according to the example described above, a low power base station advertising itself as an anchor can be given a higher weight than one not so advertising. The low power base station can adjust a local frequency and/or timing based on an average of one or more weighted differences.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), home Node B (HNB) or home evolved Node B (HeNB), collectively referred to as H(e)NB, or some other terminology.

Moreover, the term "or" is intended to mean an inclusive "or" rather than an exclusive "or" That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 is illustrated that facilitates synchronizing frequency and/or timing in a wireless network. System 100 comprises a femto node 102, which can be substantially any type of low power base station or at least a portion thereof, as described, along with various signal sources 104, 106, and 108. The signal source can include anchor signal sources 104 and/or 106, which can each be a GPS signal source, macrocell base station signal source, and/or the like, another signal source indicating it is an anchor signal source, etc. Non-anchor signal source 108 can be another femto node signal source that does not advertise as an anchor source, a macrocell base station signal source in some instances, and/or the like.

Femto node 102 can include an oscillator component 110 for producing signals for transmission at the femto node 102, a signal receiving component 112 for obtaining signals from one or more anchor sources, a signal evaluating component 114 for determining whether signals from the one or more anchor sources are received at least at a threshold signal quality, and a frequency/timing difference determining component 116 that can compute a frequency and/or timing difference between the one or more anchor signals and a local frequency and/or timing utilized by oscillator component 110. Femto node can optionally include an anchor status indicating component 118 for advertising an anchor status for femto node 102 and/or modifying a process for updating frequency and/or timing of oscillator component 110, and/or a frequency/timing synchronization component 120 for synchronizing frequency and/or timing of the oscillator component 110 to the one or more anchor sources.

According to an example, oscillator component 110 can operate according to a frequency and time for transmitting signals in a wireless network. Oscillator component 110 can be tuned according to one or more reference signals to ensure femto node 102 transmits in-synch with other base stations in the wireless network. In one example, signal receiving component 112 can obtain signals from one or more signal sources 104, 106, and/or 108. In this example, signal evaluating component 114 can determine whether the signals are from an anchor signal source 104 and/or 106, and if so, whether the signals are at least at a threshold signal quality. Where the signals are at least at the threshold signal quality, frequency/timing difference determining component 116 can compute a frequency and/or timing difference between that of the anchor signals as received and a local frequency and/or timing utilized by the oscillator component 110.

In one example, frequency/timing difference determining component 116 can further determine whether the difference is within a threshold difference. If so, this can indicate that frequency and/or timing of femto node 102 is sufficiently accurate with respect to the anchor signals. Moreover, in this case, anchor status indicating component 118 can transmit one or more broadcast signals that specify femto node 102 as an anchor for determining frequency and/or timing at other femto nodes or similar base stations. For example, this can be the signal that other femto nodes measure to acquire frequency and/or timing with which to synchronize. In another example, anchor status indicating component 118 can indicate the anchor status notification to one or more femto nodes over a backhaul connection thereto (e.g., via a core network or otherwise). In this example, femto node 102 can cease performing a frequency and/or timing updating procedure, which can include anchor status indicating component 118 terminating or suspending a related process, setting a process to make more infrequent signal measurements, and/or the like.

Where frequency/timing difference determining component 116 determines the difference in frequency and/or timing between that measured from the anchor signals and that of oscillator component 110 is not within the threshold difference, frequency/timing synchronizing component 120 can synchronize oscillator component 110 to the one or more anchor signals at least in part by adjusting a frequency and/or timing based on the difference.

In another example, where signal evaluating component 114 determines that the anchor signals are not received at least at a threshold signal quality and/or that the signals are not from anchor sources (e.g., signals sent from non-anchor signal source 108), frequency/timing difference determining component 116 can obtain frequency and/or timing differences between that of each of the received signals as compared to the local frequency and/or timing of oscillator component 110. In this example, frequency/timing synchronizing component 120 can synchronize the oscillator component 110 based on the determined timing differences.

In one example, where frequency/timing difference determining component 116 computes multiple frequency/timing differences, frequency/timing synchronizing component 120 can apply a weight to each frequency/timing difference based in part on a type of the corresponding signal and/or the source thereof. Thus, for example, where signal evaluating component 114 determines a received signal is from an anchor source, frequency/timing difference determining component 116 can assign a higher weight to the signal than if the signal is from a non-anchor source. Additionally, as described, within an anchor source class, frequency/timing difference determining component 116 can assign a higher weight to a GPS signal than to a signal from a macrocell base station, for example. In one example, signal evaluating component 114 can determine the source of the signal based at least in part on one or more characteristics thereof (e.g., a frequency over which the signal is received), a receiver used to obtain and process the signal (e.g., whether the signal was received by a dedicated receiver, such as a GPS receiver), etc.

In another example, anchor signal source 104 and/or 106 can be a femto node that advertises an anchor status, as described above. In this example, signal receiving component 112 can obtain a signal from the anchor signal source 104, and signal evaluating component 114 can determine that the source 104 is an anchor femto node. For example, signal evaluating component 114 can determine such based at least in part on an indication from the anchor signal source 104, which can be received in the signal. In another example, signal evaluating component 114 can receive the indication from the anchor signal source 104, in another signal received therefrom, as an indication received over a backhaul connection with the anchor signal source 104, and/or the like. In this example, signal evaluating component 114 can assign a weight to the signal based on determining that the anchor signal source 104 is an anchor femto node. In one example, the weight can be less than that assigned for GPS and/or macrocell base station signals.

In any case, frequency/timing synchronizing component 120 can compute a weighted average frequency and/or timing difference be applying corresponding weights to the determined frequency and/or timing differences. In one example, frequency/timing synchronizing component 120 can compute the weighted average difference, $\Delta$, according to the following formula:

$$\Delta = \text{SUM}(w_i * \Delta_i)/\text{SUM}(w_i)$$

where $w_i$ is the weight determined for a given signal, and $\Delta_i$ is the difference between the frequency and/or timing of the signal and a local frequency and/or timing used by oscillator component 110. In an example, frequency/timing synchronizing component 120 can then adjust a frequency and/or timing of oscillator component 110 by an amount $\epsilon$, where $0 < \epsilon < 1$.

Figure 2:
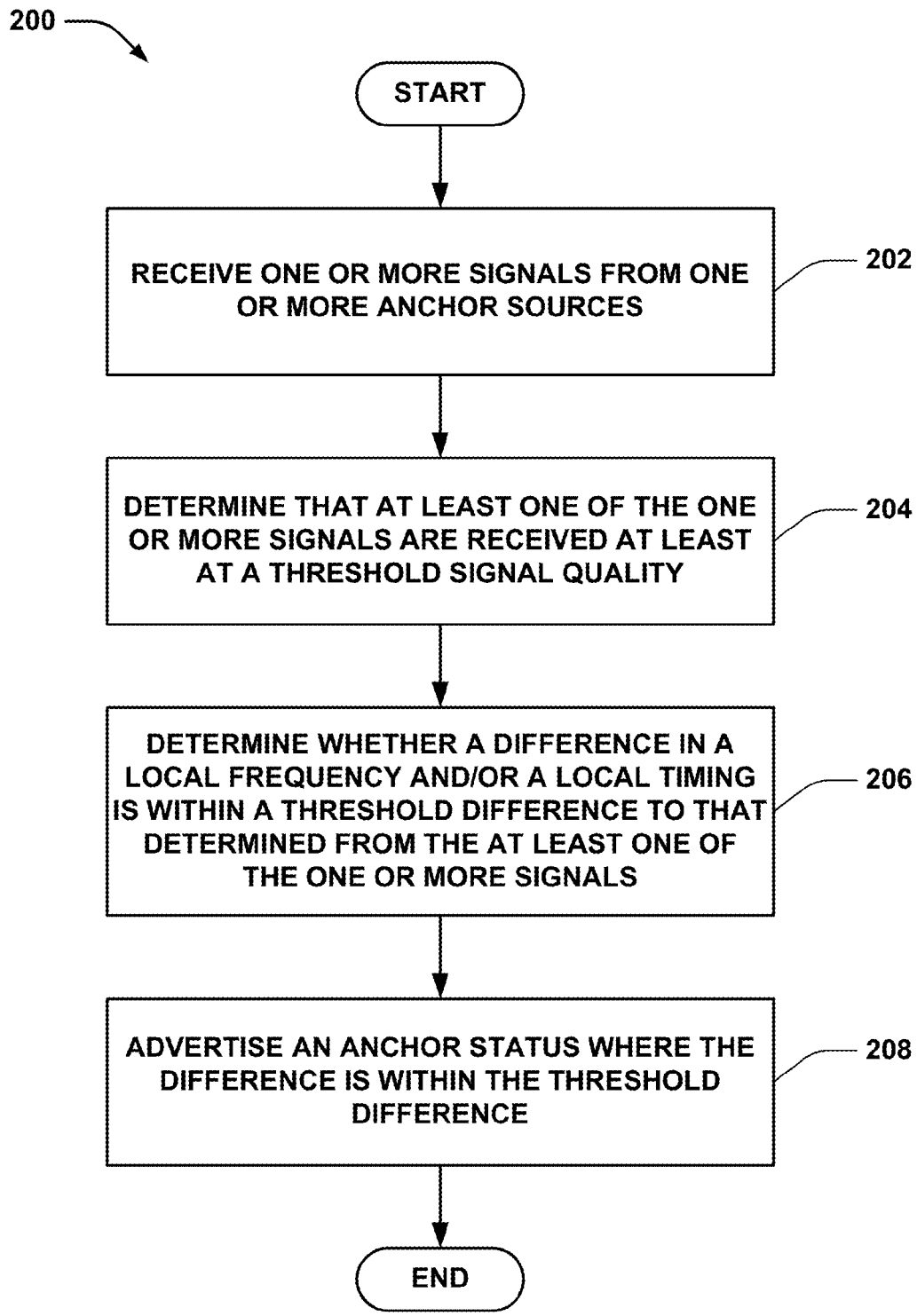
FIG. 2 is a flow chart of an aspect of an example methodology for advertising an anchor status.
Figure 3:
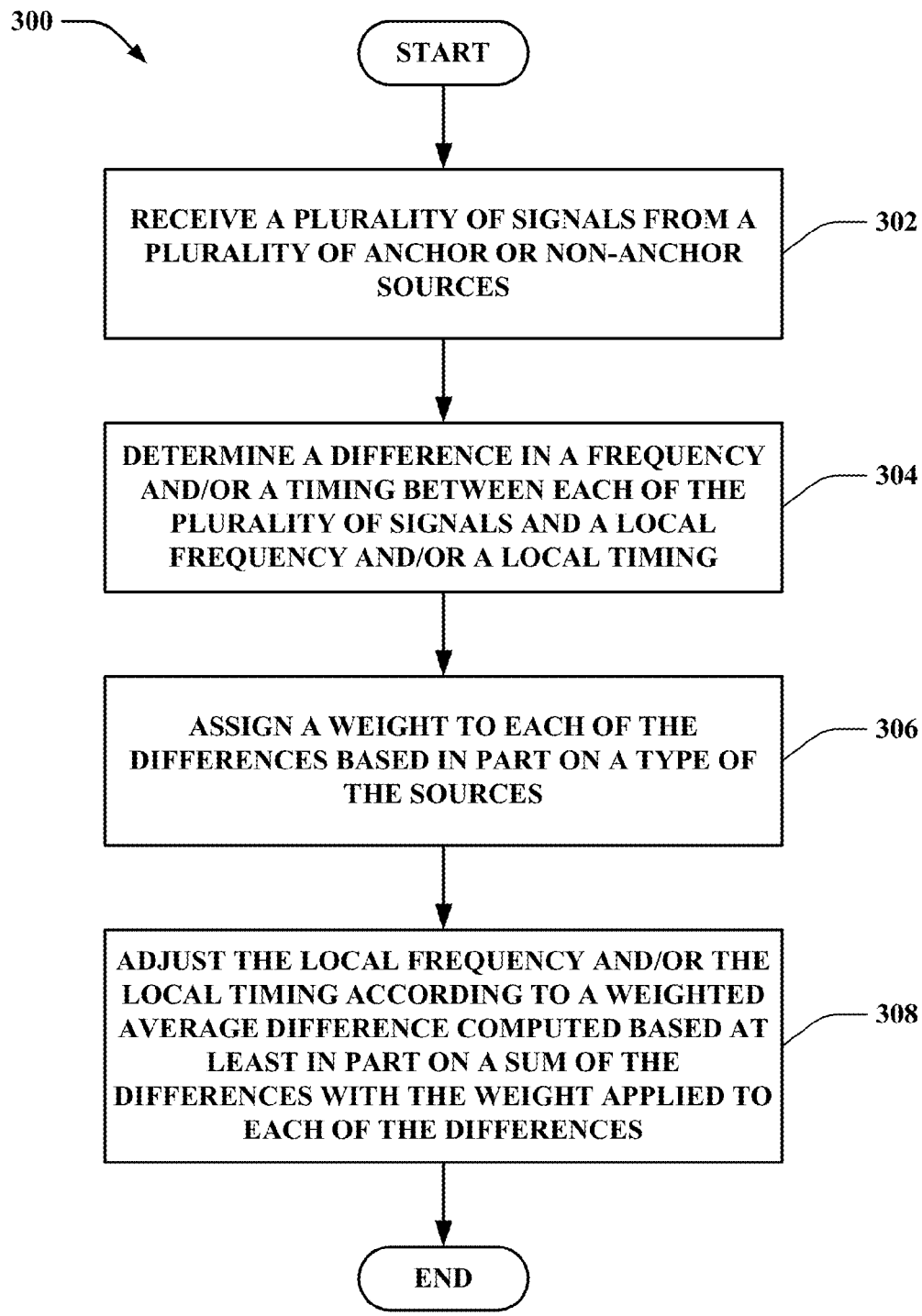
FIG. 3 is a flow chart of an aspect of an example methodology for synchronizing frequency and/or timing in a wireless network.
Figure 4:
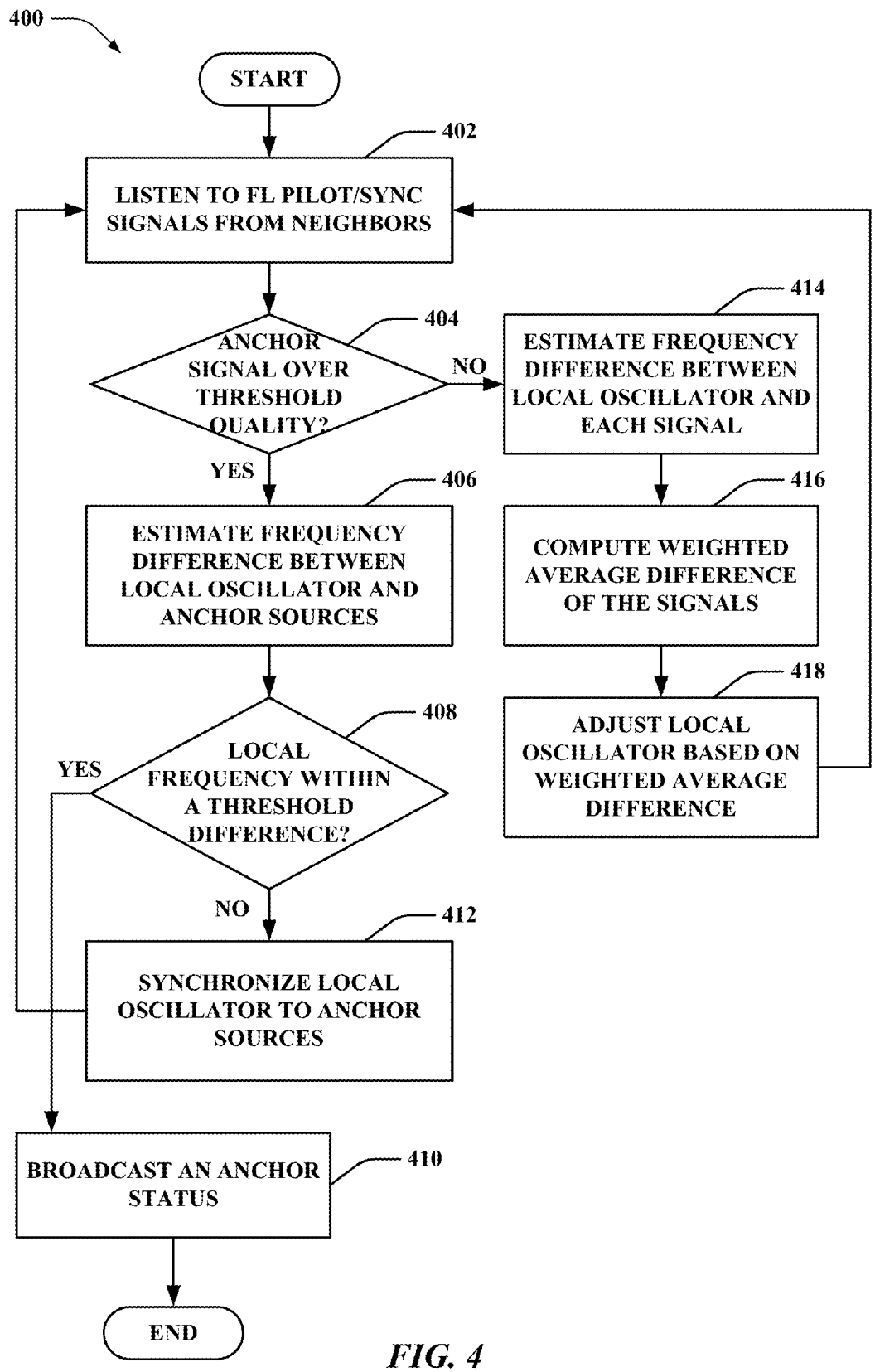
FIG. 4 is a flow chart of an aspect of an example methodology for synchronizing frequency and/or timing in a wireless network.

Referring to FIGS. 2-4, example methodologies relating to synchronizing frequency and/or timing in a femto node are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 2, an example methodology 200 is displayed that facilitates determining whether to advertise anchor status. At 202, one or more signals can be received from one or more anchor sources. For example, the anchor sources can include a GPS source, a macrocell base station source, etc. In addition, it can be determined that the one or more signals are from an anchor source based on certain characteristics of the signal, an indication in the signal of the source, a receiver over which the signal is received and processed (e.g., a dedicated GPS receiver), and/or the like. At 204, it can be determined that at least one of the one or more signals are received at least at a threshold signal quality. For example, this can include determining an signal to noise ratio (SNR) or similar signal quality metric, and comparing to a threshold value set to indicate the at least one signal is of sufficient quality for synchronizing frequency and/or time thereto.

At 206, it can be determined whether a difference in a local frequency and/or a local timing is within a threshold difference to that determined from the at least one of the one or more signals. For example the frequency and/or timing determined from the at least one signal can include a reference frequency and/or timing as compared to actual frequency and/or timing of the at least one signal. For example, where the at least one signal is a GPS signal, it may not have an actual operating frequency similar to that of the local frequency. The signal, however, can be used as a reference to compare a known difference between the operating frequency and local frequency to determine the reference frequency. At 206, the difference is determined between the local frequency and the reference frequency, in this example. At 208, an anchor status can be advertised where the difference is within the threshold difference. Thus, for example, the threshold difference can relate to indicating that the difference is close enough such that a transmitted signal can be used as an anchor. It is to be appreciated that the thresholds can be preconfigured, received in a configuration, determined based on one or more parameters and/or historical analysis of parameters, and/or the like.

Referring to FIG. 3, an example methodology 300 for synchronizing timing in a wireless network is shown. At 302, a plurality of signals can be received from a plurality of anchor or non-anchor sources. For example, this can include tuning one or more receivers to listen to the signals, and processing the signals to determine one or more metrics, such as frequency/timing information, signal quality, etc. At 304, a difference in a frequency and/or a timing can be determined between each of the plurality of signals and a local frequency and/or a local timing. As described, this can include measuring a difference between a reference frequency and/or timing and the local frequency and/or timing. At 306, a weight can be assigned to each of the differences based in part on a type of the sources.

For example, the type of the sources can be determined based on a frequency or receiver over which the signal is received, an indication in another signal of the type, and/or the like, as described. Thus, for example, differences from a signal of an anchor source can be weighed higher than those of a non-anchor source. In addition, for example, within anchor sources, GPS can be weighed higher than differences from macrocell base stations. In addition, a signal quality can be used to additionally or alternatively weigh the differences. In one example, at least one of the anchor sources can be a femto node advertising itself as an anchor source, as described above. At 308, the local frequency and/or the local timing can be adjusted according to a weighted average difference computed based at least in part on a sum of the differences with the weight applied to each of the differences.

Referring to FIG. 4, an example, methodology 400 is illustrated for synchronizing frequency and/or timing in a wireless network. At 402, forward link (FL) pilot and/or synchronization signals from neighbors can be listened to. This can occur over one or more receivers, as described (e.g., a GPS receiver, an LTE receiver, a WiFi receiver, etc.). At 404, it can be determined whether an anchor signal is over a threshold quality. This can include determining a signal quality, such as an SNR or similar metric of the signal, and comparing to the threshold, which can be preconfigured or otherwise received to indicate whether the signal quality is sufficient to synchronize frequency and/or timing thereto. If the anchor signal is over the threshold quality, at 406 a frequency difference can be estimated between a local oscillator and one or more anchor sources. The local oscillator can operate at a local frequency and/or timing, and the difference can be determined at 406, as described above.

At 408, it can be determined whether the local frequency is within a threshold difference. This can include comparing the local frequency with a reference frequency determined from the signal, as described. If so, an anchor status can be broadcasted at 410. For example, a broadcast signal can be transmitted with such an indication, an indication can be communicated to one or more femto nodes over a backhaul connection, and/or the like. If the local frequency is not within the threshold difference, at 412 the local oscillator can be synchronized to anchor sources. For example, this can include setting the frequency utilized by the local oscillator according to the difference. Then, additional FL pilot/sync signals can be listened to from neighbors at 402.

If the anchor signal is not over the threshold quality at 404, a frequency difference between the local oscillator and each signal can be estimated. For example, the difference can be estimated based on computing a difference between a local frequency of the local oscillator and a frequency determined based on the anchor signal (e.g., a reference frequency). At 416, a weighted average difference of the signal can be computed. For example, this can include adding the differences with weights applied to each difference. The weights, as described, can correspond to a signal type, a signal quality, and/or the like. At 418, a local oscillator can be adjusted based on the weighted average difference. This can include multiplying the weighted average difference by a factor, in one example, and adding or subtracting the difference from the local frequency.

Figure 5:
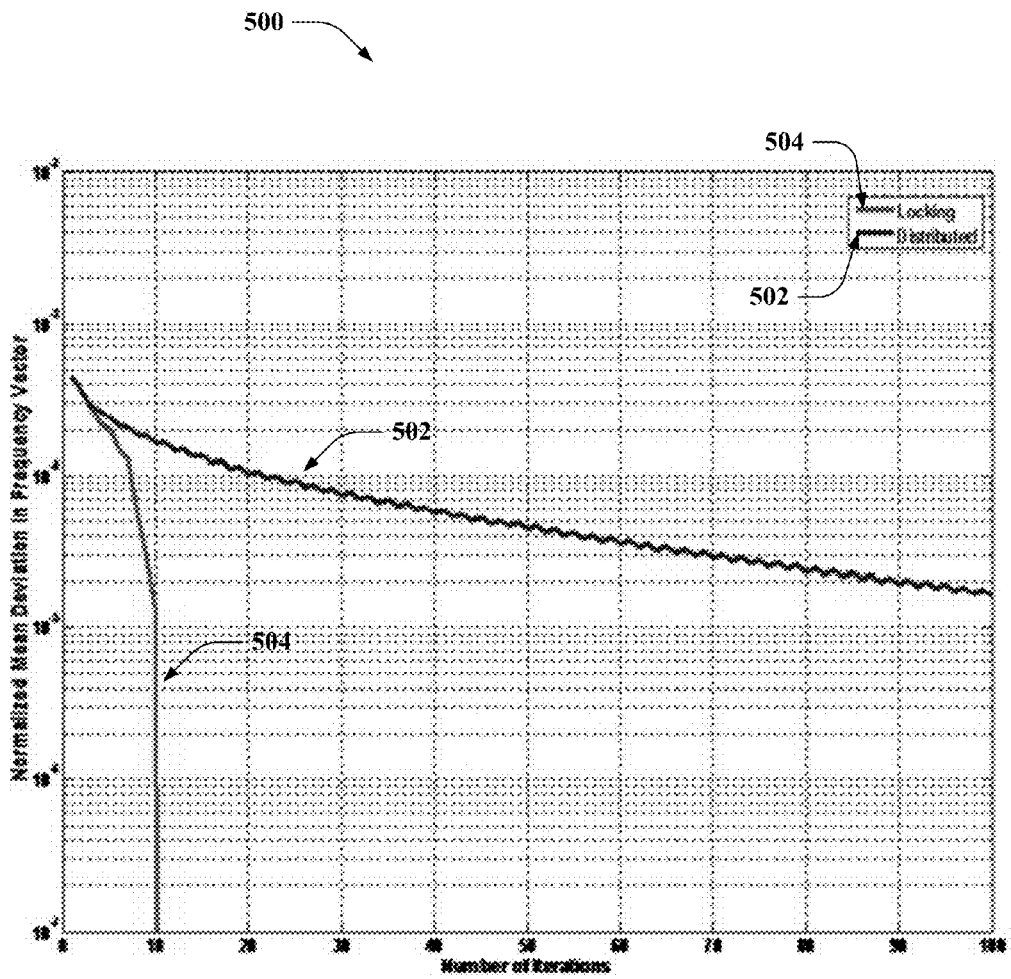
FIG. 5 is a graph of an example normalized mean deviation in frequency difference over a number of iterations of synchronizing frequency, according to aspects described herein.

Turning to FIG. 5, an example graph 500 is depicted that illustrates a normalized mean deviation in frequency difference over a number of iterations using the concepts described above. Where no anchor signal qualities are at least at the threshold level, at 502, the frequency becomes more synchronized over time. Where an anchor signal quality is at the threshold level, at 504 the local oscillator is locked from further adjustment, and the corresponding femto node can be advertised as an anchor, as described.

It will be appreciated that, in accordance with one or more aspects described herein, inferences can be made regarding determining a factor for applying to a weighed threshold, determining one or more thresholds, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
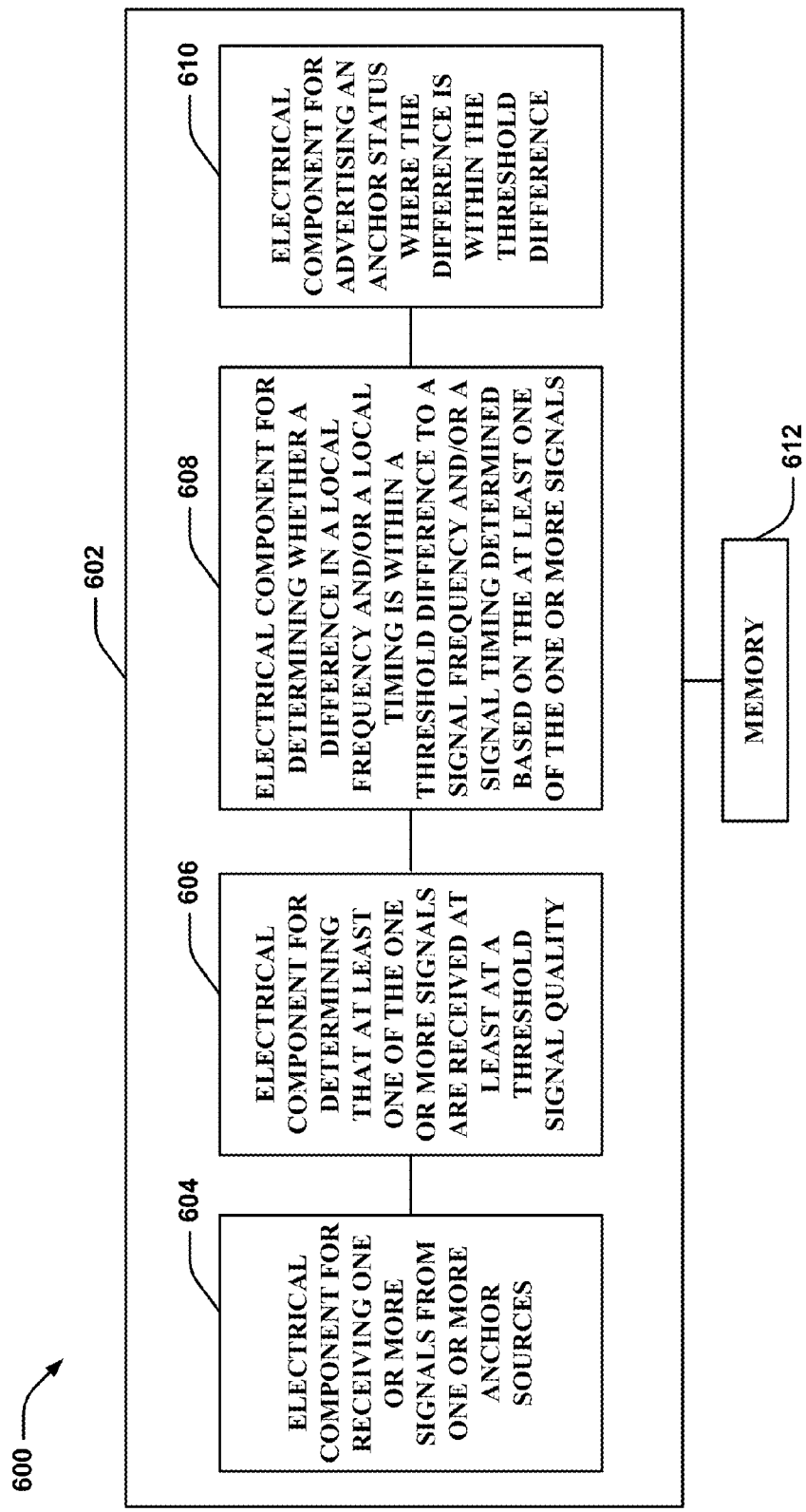
FIG. 6 is a block diagram of an example system that advertises an anchor status.

With reference to FIG. 6, illustrated is a system 600 for synchronizing frequency and/or timing in a wireless network. For example, system 600 can reside at least partially within a femto node. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include an electrical component for receiving one or more signals from one or more anchor sources 604. Further, logical grouping 602 can comprise an electrical component for determining that at least one of the one or more signals are received at least at a threshold signal quality 606. For example, the threshold can be preconfigured or otherwise received, as described, to indicate whether the signal is strong enough to use for synchronizing.

Further, logical grouping 602 can include an electrical component for determining whether a difference in a local frequency and/or a local timing is within a threshold difference to a signal frequency and/or signal timing determined based on the at least one of the one or more signals 608. This can indicate whether the frequency and/or timing of system 600 is sufficiently accurate to advertise as an anchor. Thus, logical grouping 602 can also include an electrical component for advertising an anchor status where the difference is within the threshold difference 610.

For example, electrical component 604 can include a signal receiving component 112, as described above. In addition, for example, electrical component 606, in an aspect, can include a signal evaluating component 114, as described above. Moreover, electrical component 608 can include a frequency/timing difference determining component 116, and/or electrical component 610 can include an anchor status indicating component 118, for example.

Additionally, system 600 can include a memory 612 that retains instructions for executing functions associated with the electrical components 604, 606, 608, and 610. While shown as being external to memory 612, it is to be understood that one or more of the electrical components 604, 606, 608, and 610 can exist within memory 612. In one example, electrical components 604, 606, 608, and 610 can comprise at least one processor, or each electrical component 604, 606, 608, and 610 can be a corresponding module of at least one processor. Moreover, in an additional or alternative example, electrical components 604, 606, 608, and 610 can be a computer program product comprising a computer readable medium, where each electrical component 604, 606, 608, and 610 can be corresponding code.

Figure 7:
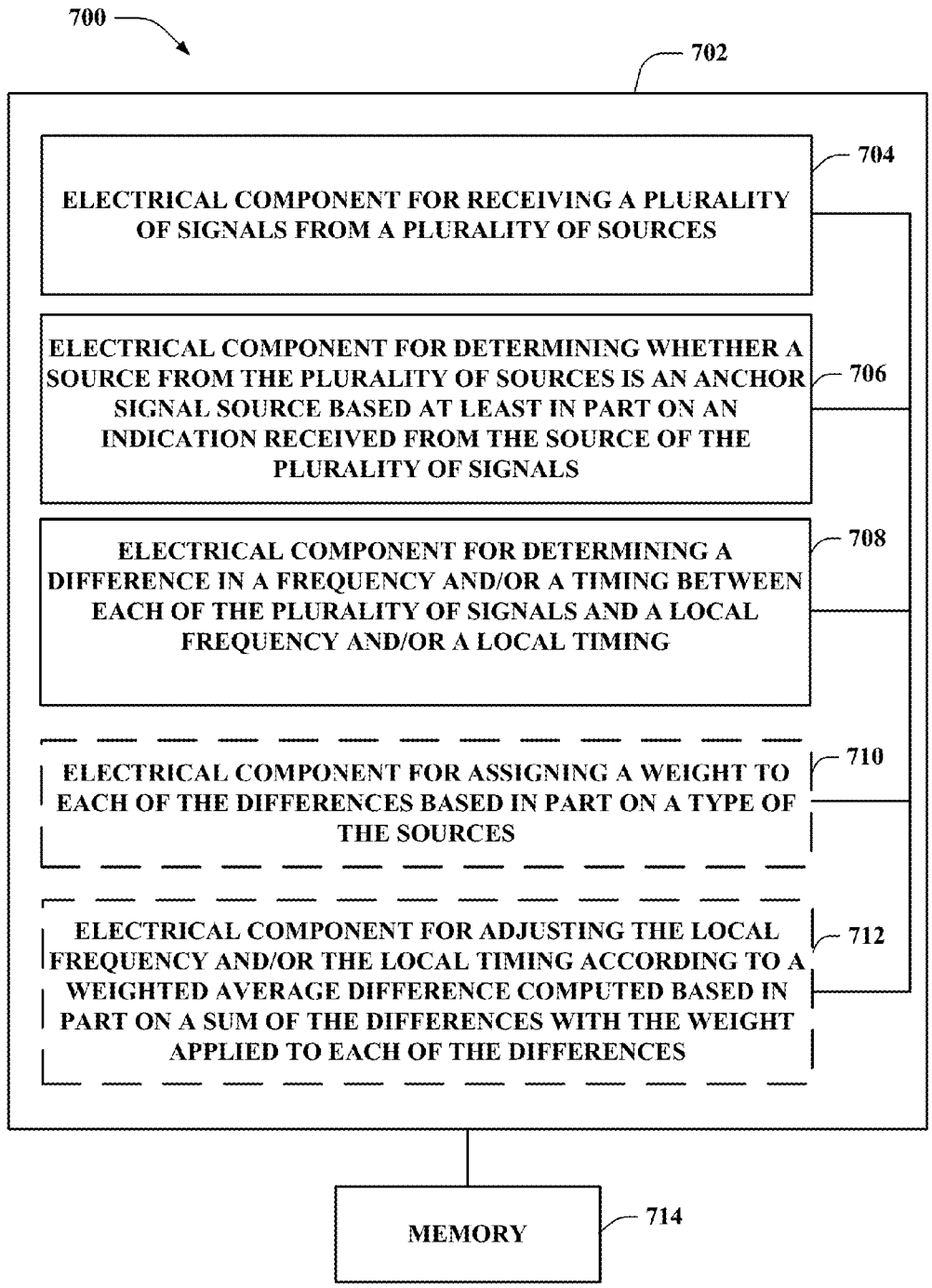
FIG. 7 is a block diagram of an example system that synchronizes frequency and/or timing in a wireless network.

With reference to FIG. 7, illustrated is a system 700 for synchronizing frequency and/or timing in a wireless network. For example, system 700 can reside at least partially within a femto node. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for receiving a plurality of signals from a plurality of sources 704. For example, the one or more sources can be anchor or non-anchor, and can be of different types (e.g., GPS, macrocell base station, femto node advertising anchor status or not, etc.).

Further, logical grouping 702 can comprise an electrical component for determining whether a source from the plurality of sources is an anchor signal source based at least in part on an indication received from the source of the plurality of signals 706. In an aspect, the indication may be received from a corresponding femto cell. In another aspect, the indication may be received over a backhaul connection with the femto node.

Further, logical grouping 702 can comprise an electrical component for determining a difference in a frequency and/or a timing between each of the plurality of signals and a local frequency and/or a local timing 708.

Further, In an optional aspect, logical grouping 702 can include an electrical component for assigning a weight to each of the differences based in part on a type of the source 708. For example, for anchor sources and/or other more reliable sources, such as GPS, a higher weight can be assigned. In addition, logical grouping 702 can include an electrical component for adjusting the local frequency and/or the local timing according to a weighted average difference computed based in part on a sum of the differences with the weight applied to each of the differences 712.

For example, electrical component 704 can include a signal receiving component 112, as described above. In addition, for example, electrical components 706 and 708, in an aspect, can include a frequency/timing difference determining component 116, as described above. Moreover, in an optional aspect, electrical components 710 and 712 can be part of a frequency/timing synchronizing component 120, for example.

Additionally, system 700 can include a memory 714 that retains instructions for executing functions associated with the electrical components 704, 706, 708, 710, and 712. While shown as being external to memory 714, it is to be understood that one or more of the electrical components 704, 706, 708, 710, and 712 can exist within memory 714. In one example, electrical components 704, 706, 708, 710, and 712 can comprise at least one processor, or each electrical component 704, 706, 708, 710, and 712 can be a corresponding module of at least one processor. Moreover, in an additional or alternative example, electrical components 704, 706, 708, 710, and 712 can be a computer program product comprising a computer readable medium, where each electrical component 704, 706, 708, 710, and 712 can be corresponding code.

Figure 8:
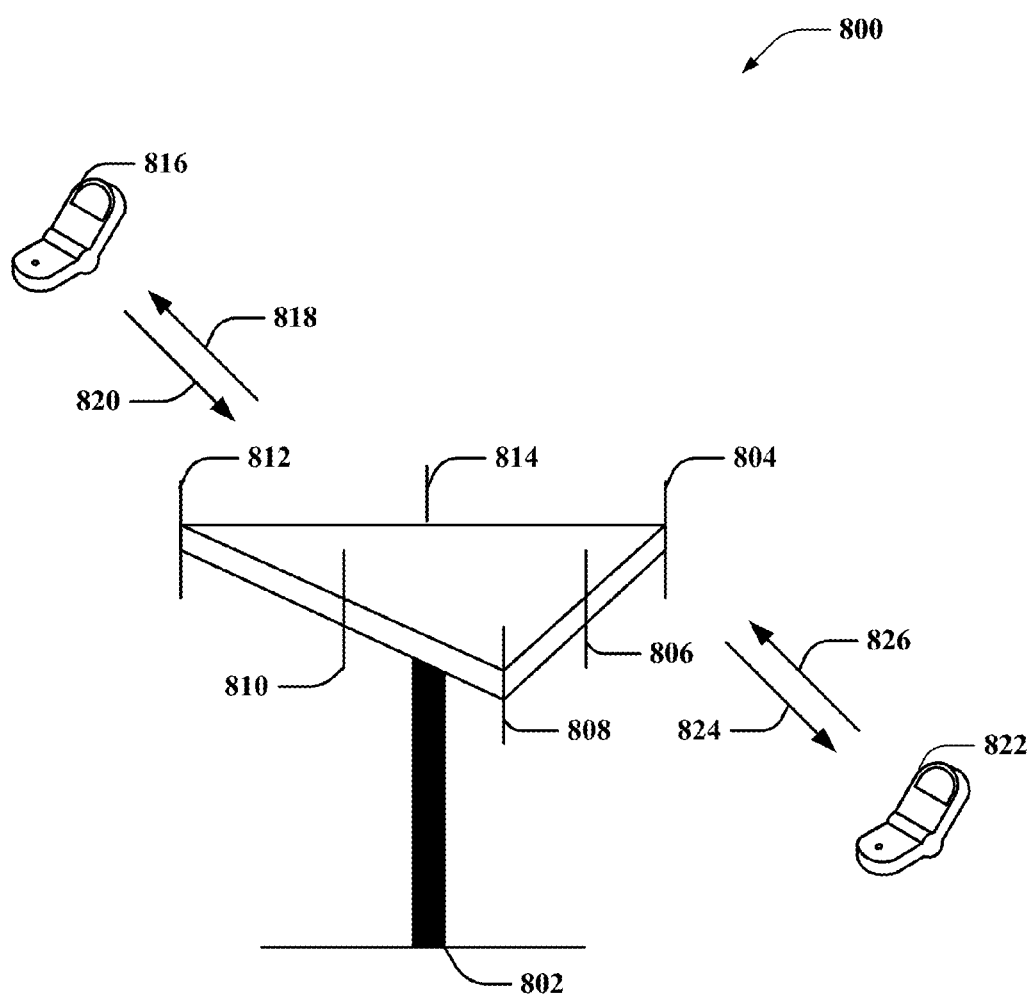
FIG. 8 is a block diagram of an example wireless communication system, according to aspects described herein.

Referring now to FIG. 8, a wireless communication system 800 is illustrated in accordance with various embodiments presented herein. System 800 comprises a base station 802 that can include multiple antenna groups. For example, one antenna group can include antennas 804 and 806, another group can comprise antennas 808 and 810, and an additional group can include antennas 812 and 814. Two antennas are illustrated for each antenna group; however, more or fewer antennas can be utilized for each group. Base station 802 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 802 can communicate with one or more mobile devices such as mobile device 816 and mobile device 822; however, it is to be appreciated that base station 802 can communicate with substantially any number of mobile devices similar to mobile devices 816 and 822. Mobile devices 816 and 822 can be, for example, cellular phones, smart phones, laptops, handheld communication devices, handheld computing devices, satellite radios, global positioning systems, PDAs, and/or any other suitable device for communicating over wireless communication system 800. As depicted, mobile device 816 is in communication with antennas 812 and 814, where antennas 812 and 814 transmit information to mobile device 816 over a forward link 818 and receive information from mobile device 816 over a reverse link 820. Moreover, mobile device 822 is in communication with antennas 804 and 806, where antennas 804 and 806 transmit information to mobile device 822 over a forward link 824 and receive information from mobile device 822 over a reverse link 826. In a frequency division duplex (FDD) system, forward link 818 can utilize a different frequency band than that used by reverse link 820, and forward link 824 can employ a different frequency band than that employed by reverse link 826, for example. Further, in a time division duplex (TDD) system, forward link 818 and reverse link 820 can utilize a common frequency band and forward link 824 and reverse link 826 can utilize a common frequency band.

Each group of antennas and/or the area in which they are designated to communicate can be referred to as a sector of base station 802. For example, antenna groups can be designed to communicate to mobile devices in a sector of the areas covered by base station 802. In communication over forward links 818 and 824, the transmitting antennas of base station 802 can utilize beamforming to improve signal-to-noise ratio of forward links 818 and 824 for mobile devices 816 and 822. Also, while base station 802 utilizes beamforming to transmit to mobile devices 816 and 822 scattered randomly through an associated coverage, mobile devices in neighboring cells can be subject to less interference as compared to a base station transmitting through a single antenna to all its mobile devices. Moreover, mobile devices 816 and 822 can communicate directly with one another using a peer-to-peer or ad hoc technology as depicted. According to an example, system 800 can be a multiple-input multiple-output (MIMO) communication system.

Figure 9:
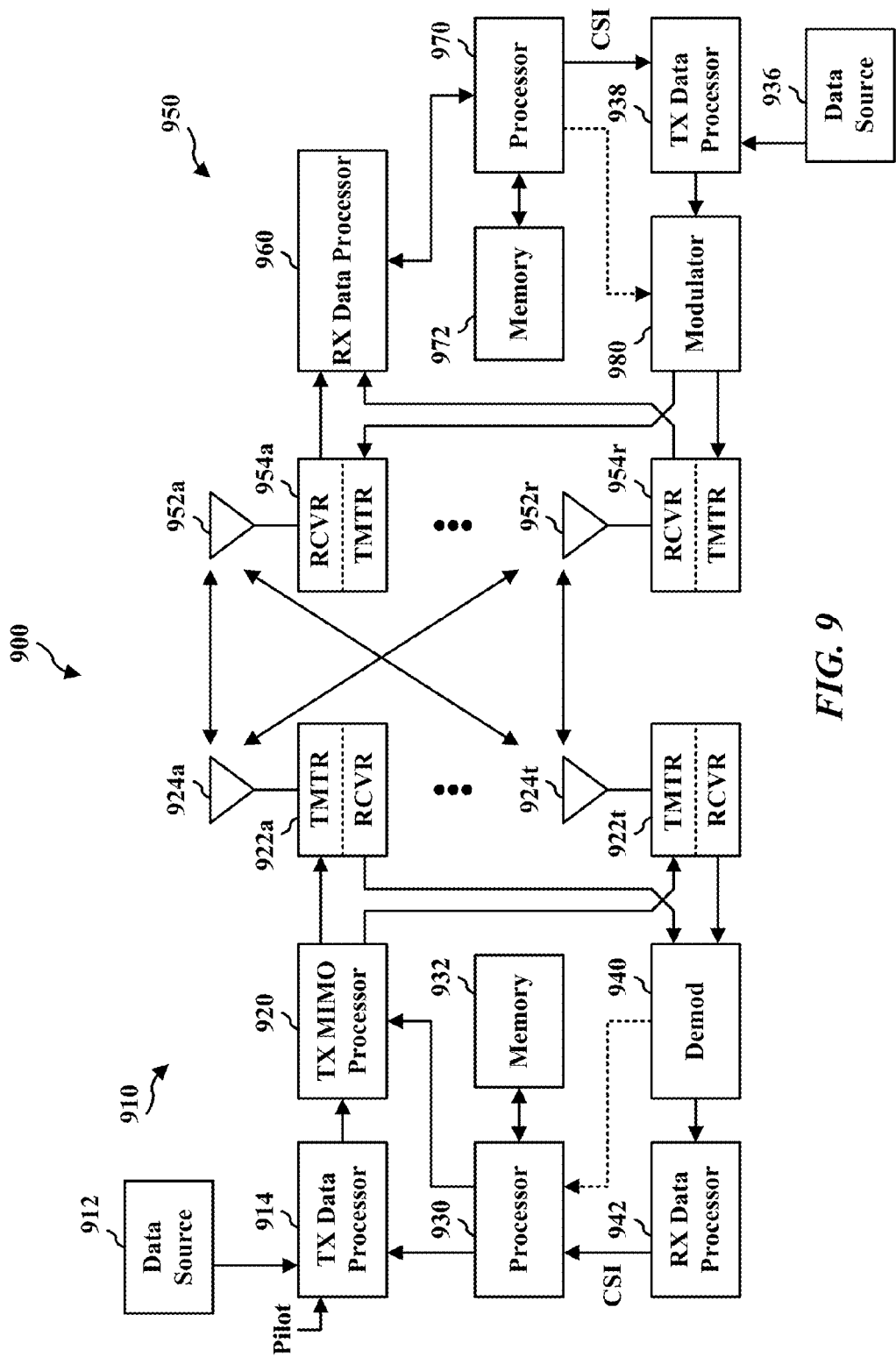
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1, 6, and 7) and/or methods (FIGS. 2-4) described herein to facilitate wireless communication there between. For example, components or functions of the systems and/or methods described herein can be part of a memory 932 and/or 972 or processors 930 and/or 970 described below, and/or can be executed by processors 930 and/or 970 to perform the disclosed functions.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform functionalities described herein to support frequency and/or timing synchronization.

Figure 10:
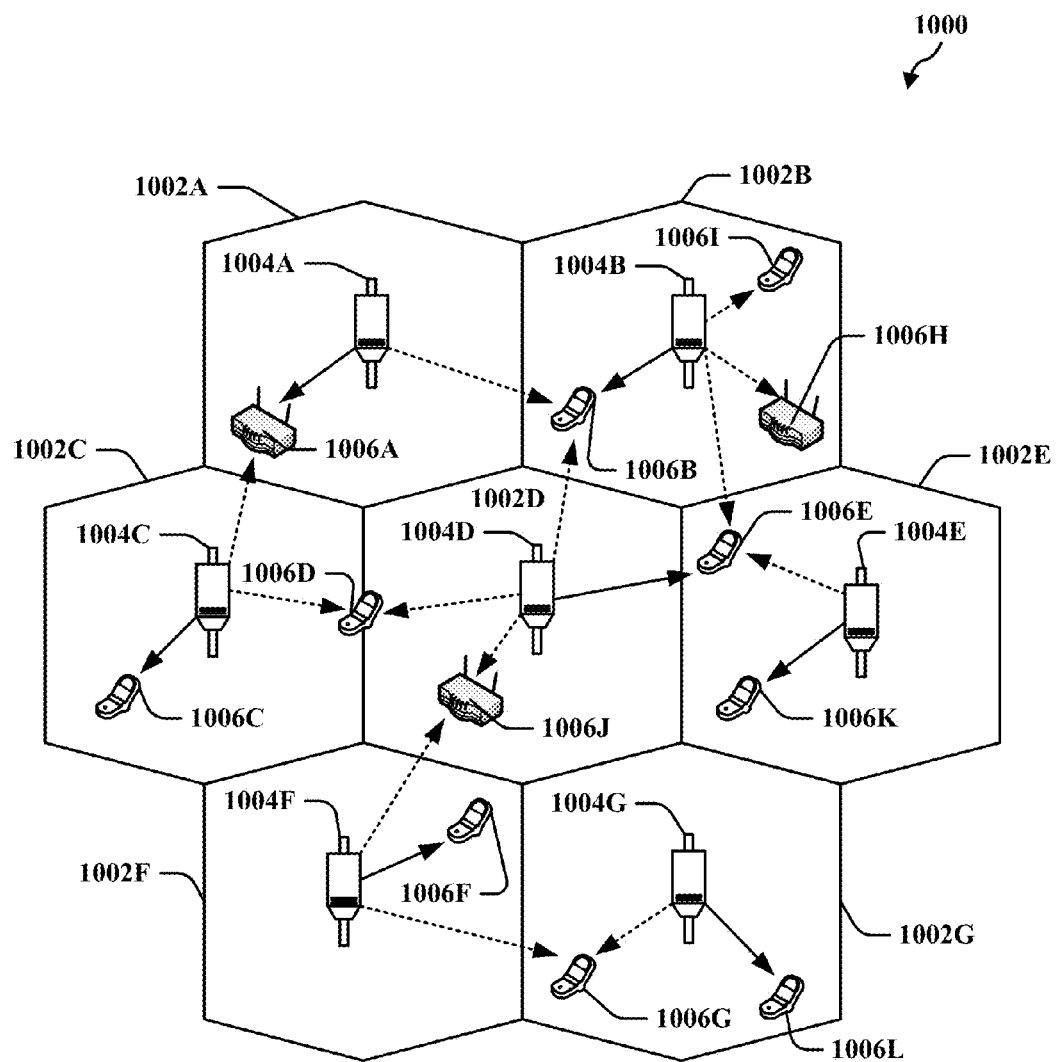
FIG. 10 illustrates an example wireless communication system, configured to support a number of devices, in which the aspects herein can be implemented.

FIG. 10 illustrates a wireless communication system 1000, configured to support a number of users, in which the teachings herein may be implemented. The system 1000 provides communication for multiple cells 1002, such as, for example, macro cells 1002A-1002G, with each cell being serviced by a corresponding access node 1004 (e.g., access nodes 1004A-1004G). As shown in FIG. 10, access terminals 1006 (e.g., access terminals 1006A-1006L) can be dispersed at various locations throughout the system over time. Each access terminal 1006 can communicate with one or more access nodes 1004 on a forward link (FL) and/or a reverse link (RL) at a given moment, depending upon whether the access terminal 1006 is active and whether it is in soft handoff, for example. The wireless communication system 1000 can provide service over a large geographic region.

Figure 11:
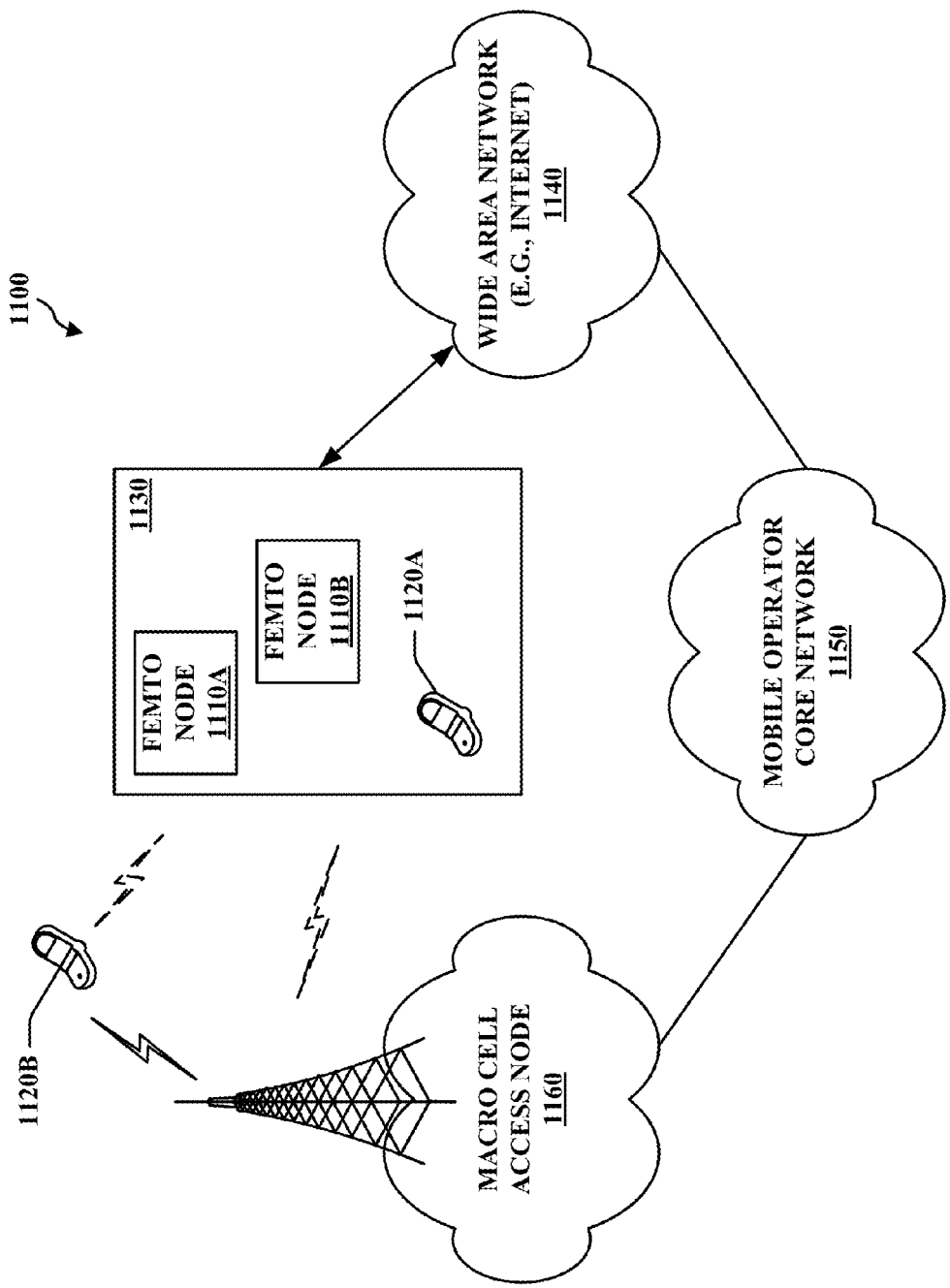
FIG. 11 is an illustration of an exemplary communication system to enable deployment of femtocells within a network environment.

FIG. 11 illustrates an exemplary communication system 1100 where one or more femto nodes are deployed within a network environment. Specifically, the system 1100 includes multiple femto nodes 1110A and 1110B (e.g., femtocell nodes or H(e)NB) installed in a relatively small scale network environment (e.g., in one or more user residences 1130). Each femto node 1110 can be coupled to a wide area network 1140 (e.g., the Internet) and a mobile operator core network 1150 via a digital subscriber line (DSL) router, a cable modem, a wireless link, or other connectivity means (not shown). As will be discussed below, each femto node 1110 can be configured to serve associated access terminals 1120 (e.g., access terminal 1120A) and, optionally, alien access terminals 1120 (e.g., access terminal 1120B). In other words, access to femto nodes 1110 can be restricted such that a given access terminal 1120 can be served by a set of designated (e.g., home) femto node(s) 1110 but may not be served by any non-designated femto nodes 1110 (e.g., a neighbor's femto node).

Figure 12:
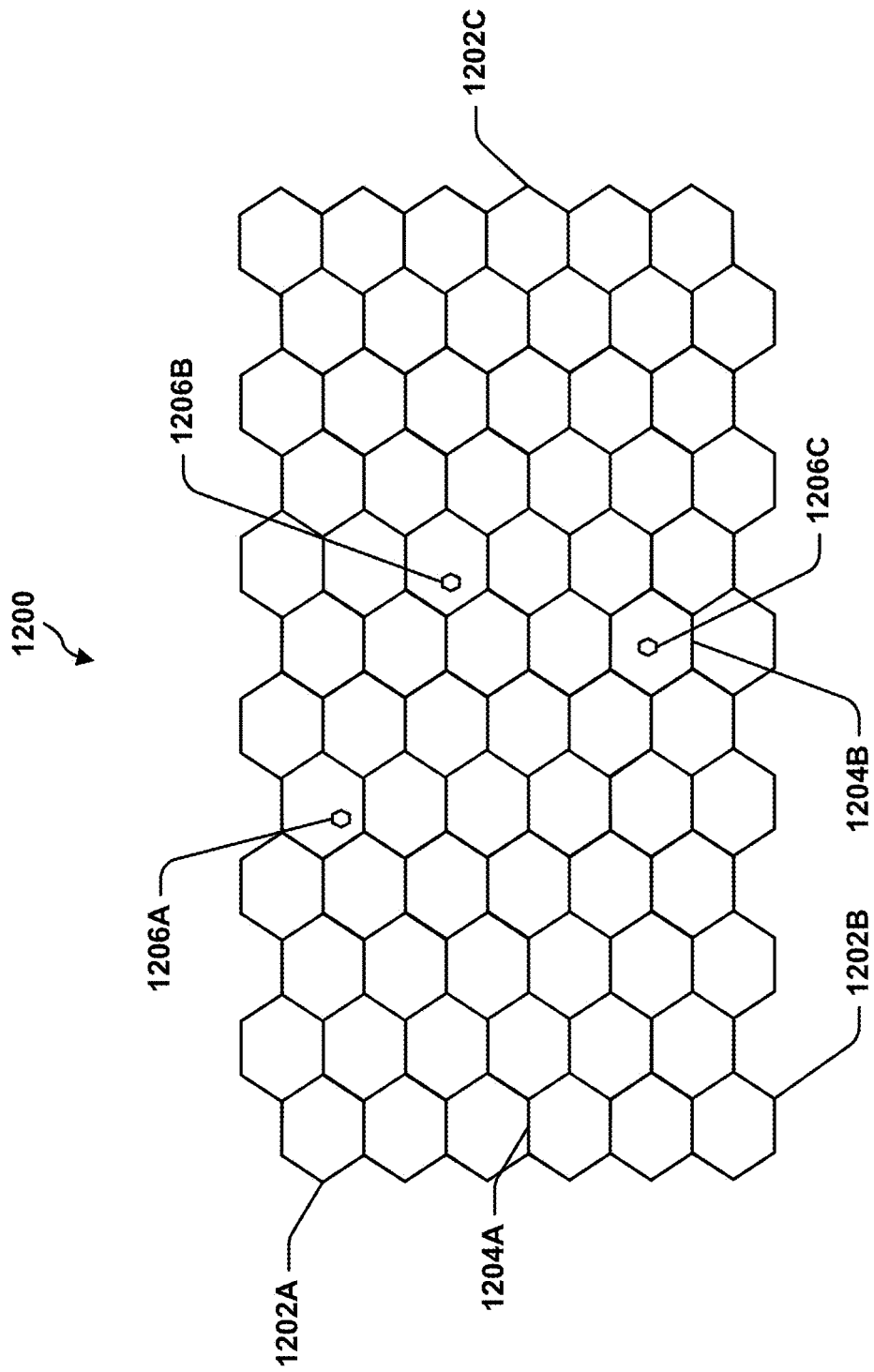
FIG. 12 illustrates an example of a coverage map having several defined tracking areas.

FIG. 12 illustrates an example of a coverage map 1200 where several tracking areas 1202 (or routing areas or location areas) are defined, each of which includes several macro coverage areas 1204. Here, areas of coverage associated with tracking areas 1202A, 1202B, and 1202C are delineated by the wide lines and the macro coverage areas 1204 are represented by the hexagons. The tracking areas 1202 also include femto coverage areas 1206. In this example, each of the femto coverage areas 1206 (e.g., femto coverage area 1206C) is depicted within a macro coverage area 1204 (e.g., macro coverage area 1204B). It should be appreciated, however, that a femto coverage area 1206 may not lie entirely within a macro coverage area 1204. In practice, a large number of femto coverage areas 1206 can be defined with a given tracking area 1202 or macro coverage area 1204. Also, one or more pico coverage areas (not shown) can be defined within a given tracking area 1202 or macro coverage area 1204.

Referring again to FIG. 11, the owner of a femto node 1110 can subscribe to mobile service, such as, for example, 3G mobile service, offered through the mobile operator core network 1150. In another example, the femto node 1110 can be operated by the mobile operator core network 1150 to expand coverage of the wireless network. In addition, an access terminal 1120 can be capable of operating both in macro environments and in smaller scale (e.g., residential) network environments. Thus, for example, depending on the current location of the access terminal 1120, the access terminal 1120 can be served by a macro cell access node 1160 or by any one of a set of femto nodes 1110 (e.g., the femto nodes 1110A and 1110B that reside within a corresponding user residence 1130). For example, when a subscriber is outside his home, he is served by a standard macro cell access node (e.g., node 1160) and when the subscriber is at home, he is served by a femto node (e.g., node 1110A). Here, it should be appreciated that a femto node 1110 can be backward compatible with existing access terminals 1120.

A femto node 1110 can be deployed on a single frequency or, in the alternative, on multiple frequencies. Depending on the particular configuration, the single frequency or one or more of the multiple frequencies can overlap with one or more frequencies used by a macro cell access node (e.g., node 1160). In some aspects, an access terminal 1120 can be configured to connect to a preferred femto node (e.g., the home femto node of the access terminal 1120) whenever such connectivity is possible. For example, whenever the access terminal 1120 is within the user's residence 1130, it can communicate with the home femto node 1110.

In some aspects, if the access terminal 1120 operates within the mobile operator core network 1150 but is not residing on its most preferred network (e.g., as defined in a preferred roaming list), the access terminal 1120 can continue to search for the most preferred network (e.g., femto node 1110) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1120 can limit the search for specific band and channel. For example, the search for the most preferred system can be repeated periodically. Upon discovery of a preferred femto node, such as femto node 1110, the access terminal 1120 selects the femto node 1110 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1110 that reside within the corresponding user residence 1130). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for synchronizing at least one of frequency, timing, or combination thereof in a wireless network, comprising:

receiving, at a femto node, one or more signals from one or more anchor sources;

determining that at least one of the one or more signals is received at least at a threshold signal quality;

determining whether a difference in at least one of a local frequency, a local timing, or any combination thereof is within a threshold difference to a respective one of a signal frequency, a signal timing, or any combination thereof determined based on the at least one of the one or more signals; and advertising an anchor status indicating the femto node is an anchor source for synchronizing at least one of frequency, timing, or any combination thereof where the difference is within the threshold difference.

2. The method of claim 1, further comprising terminating or suspending at least one of a frequency update procedure, a timing update procedure, or any combination thereof based upon determining that the difference is within the threshold difference.

3. The method of claim 1, further comprising synchronizing the at least one of the local frequency, the local timing, or the combination thereof to the respective one of the signal frequency, the signal timing, or the combination thereof where the difference is not within the threshold difference.

4. The method of claim 1, wherein the advertising the anchor status comprises transmitting a broadcast signal that indicates the anchor status.

5. The method of claim 1, wherein the advertising the anchor status comprises notifying one or more femto nodes of the anchor status over a backhaul connection.

6. An apparatus for synchronizing at least one of frequency, timing, or any combination thereof in a wireless network, comprising:

at least one processor configured to:

receive one or more signals from one or more anchor sources;

determine that at least one of the one or more signals is received at least at a threshold signal quality;

determine whether a difference in at least one of a local frequency, a local timing, or any combination thereof is within a threshold difference to a respective one of a signal frequency, a signal timing, or any combination thereof determined based on the at least one of the one or more signals; and advertise an anchor status indicating the apparatus is an anchor source for synchronizing at least one of frequency, timing, or any combination thereof where the difference is within the threshold difference; and a memory coupled to the at least one processor.

7. The apparatus of claim 6, wherein the at least one processor is further configured to terminate or suspend at least one of a frequency update procedure, a timing update procedure, or any combination thereof based upon determining that the difference is within the threshold difference.

8. The apparatus of claim 6, wherein the at least one processor is further configured to synchronize the at least one of the local frequency, the local timing, or the combination thereof to the respective one of the signal frequency, the signal timing, or the combination thereof where the difference is not within the threshold difference.

9. The apparatus of claim 6, wherein to advertise the anchor status the at least one processor is further configured to transmit a broadcast signal that indicates the anchor status.

10. The apparatus of claim 6, wherein to advertise the anchor status the at least one processor is further configured to notify one or more femto nodes of the anchor status over a backhaul connection.

11. An apparatus for synchronizing at least one of frequency, timing, or any combination thereof in a wireless network, comprising:

means for receiving one or more signals from one or more anchor sources;

means for determining that at least one of the one or more signals is received at least at a threshold signal quality;

means for determining whether a difference in at least one of a local frequency, a local timing, or any combination thereof is within a threshold difference to a respective one of a signal frequency, a signal timing, or any combination thereof determined based on the at least one of the one or more signals; and means for advertising an anchor status indicating the apparatus is an anchor source for synchronizing at least one of frequency, timing, or any combination thereof where the difference is within the threshold difference.

12. The apparatus of claim 11, wherein the means for advertising the anchor status terminates or suspends at least one of a frequency update procedure, a timing update procedure, or any combination thereof based upon determining that the difference is within the threshold difference.

13. The apparatus of claim 11, further comprising means for synchronizing the at least one of the local frequency, the local timing, or the combination thereof to the respective one of the signal frequency, the signal timing, or the combination thereof where the difference is not within the threshold difference.

14. The apparatus of claim 11, wherein the means for advertising advertises the anchor status in part by transmitting a broadcast signal that indicates the anchor status.

15. The apparatus of claim 11, wherein the means for advertising advertises the anchor status in part by notifying one or more femto nodes of the anchor status over a backhaul connection.

16. A computer program product for synchronizing at least one of frequency, timing, or any combination thereof in a wireless network, comprising:

a computer-readable medium, comprising:

code for causing at least one computer to receive, at a femto node, one or more signals from one or more anchor sources;

code for causing the at least one computer to determine that at least one of the one or more signals is received at least at a threshold signal quality;

code for causing the at least one computer to determine whether a difference in at least one of a local frequency, a local timing, or any combination thereof is within a threshold difference to a respective one of a signal frequency, a signal timing, or any combination thereof determined based on the at least one of the one or more signals; and code for causing the at least one computer to advertise an anchor status indicating the femto node is an anchor source for synchronizing at least one of frequency, timing, or any combination thereof where the difference is within the threshold difference.

17. The computer program product of claim 16, wherein the computer-readable medium further comprises code for causing the at least one computer to terminate or suspend at least one of a frequency update procedure, a timing update procedure, or any combination thereof based upon determining that the difference is within the threshold difference.

18. The computer program product of claim 16, wherein the computer-readable medium further comprises code for causing the at least one computer to synchronize the at least one of the local frequency, the local timing, or the combination thereof to the respective one of the signal frequency, the signal timing, or the combination thereof where the difference is not within the threshold difference.

19. The computer program product of claim 16, wherein the code for causing the at least one computer to advertise advertises the anchor status in part by transmitting a broadcast signal that indicates the anchor status.

20. The computer program product of claim 16, wherein the code for causing the at least one computer to advertise advertises the anchor status in part by notifying one or more femto nodes of the anchor status over a backhaul connection.

21. A method for synchronizing at least one of frequency, timing, or any combination thereof in a wireless network, comprising:

receiving a plurality of signals from a plurality of sources;

determining whether a source from the plurality of sources is an anchor signal source based at least in part on an indication received from the source of the plurality of signals;

determining a plurality of differences in at least one of a frequency, a timing, or any combination thereof between each of the plurality of signals and a respective one of a local frequency, a local timing, or any combination thereof;

assigning a weight to each of the plurality of differences based in part on a type of each source of the plurality of sources; and adjusting the respective one of the local frequency, the local timing, or the combination thereof according to a weighted average difference computed based in part on a sum of the plurality of differences with the weight applied to each of the plurality of differences.

22. The method of claim 21, wherein at least one source of the plurality of sources is different from another one of the plurality of sources.

23. The method of claim 22, wherein the at least one source of the plurality of sources is a femto node.

24. The method of claim 23, further comprising receiving the indication in one of the plurality of signals corresponding to the femto node.

25. The method of claim 23, further comprising receiving the indication over a backhaul connection with the femto node.

26. An apparatus for synchronizing at least one of frequency, timing, or any combination thereof in a wireless network, comprising:
at least one processor configured to:
receive a plurality of signals from a plurality of sources;
determine whether a source from the plurality of sources is an anchor signal source based at least in part on an indication received from the source of the plurality of signals;
determine a plurality of differences in at least one of a frequency, a timing, or any combination thereof between each of the plurality of signals and a respective one of a local frequency, a local timing, or any combination thereof;
assign a weight to each of the plurality of differences based in part on a type of each source of the plurality of sources; and
adjust the respective one of the local frequency, the local timing, or the combination thereof according to a weighted average difference computed based in part on a sum of the plurality differences with the weight applied to each of the plurality of differences; and
a memory coupled to the at least one processor.

27. The apparatus of claim 26, wherein at least one source of the plurality of sources is different from another one of the plurality of sources.

28. The apparatus of claim 27, wherein the at least one source of the plurality of sources is a femto node.

29. The apparatus of claim 28, wherein the at least one processor is further configured to receive the indication in one of the plurality of signals corresponding to the femto node.

30. The apparatus of claim 28, wherein the at least one processor is further configured to receive the indication over a backhaul connection with the femto node.

31. An apparatus for synchronizing at least one of frequency, timing, or any combination thereof in a wireless network, comprising:
means for receiving a plurality of signals from a plurality of sources;
means for determining whether a source from the plurality of sources is an anchor signal source based at least in part on an indication received from the source of the plurality of signals;
means for determining a plurality of differences in at least one of a frequency, a timing, or any combination thereof between each of the plurality of signals and a respective one of a local frequency, a local timing, or any combination thereof;
means for assigning a weight to each of the plurality of differences based in part on a type of each source of the plurality of sources; and
means for adjusting the respective one of the local frequency, the local timing, or the combination thereof according to a weighted average difference computed based in part on a sum of the plurality of differences with the weight applied to each of the plurality of differences.

32. The apparatus of claim 31, wherein at least one source of the plurality of sources is different from another one of the plurality of sources.

33. The apparatus of claim 32, wherein the at least one source of the plurality of sources is a femto node.

34. The apparatus of claim 33, wherein the means for receiving is further for receiving the indication in one of the plurality of signals corresponding to the femto node.

35. The apparatus of claim 33, wherein the means for receiving is further for receiving the indication over a backhaul connection with the femto node.

36. A computer program product for synchronizing at least one of frequency, timing, or any combination thereof in a wireless network, comprising:
a computer-readable medium, comprising:
code for causing at least one computer to receive a plurality of signals from a plurality of sources;
code for causing the at least one computer to determine whether a source from the plurality of sources is an anchor signal source based at least in part on an indication received from the source of the plurality of signals;
code for causing the at least one computer to determine a plurality of differences in at least one of a frequency, a timing, or any combination thereof between each of the plurality of signals and a respective one of a local frequency, a local timing, or any combination thereof;
code for causing the at least one computer to assign a weight to each of the plurality of differences based in part on a type of each source of the plurality of sources; and
code for causing the at least one computer to adjust the respective one of the local frequency, the local timing, or the combination thereof according to a weighted average difference computed based in part on a sum of the plurality of differences with the weight applied to each of the plurality of differences.

37. The computer program product of claim 36, wherein at least one source of the plurality of sources is different from another one of the plurality of sources.

38. The computer program product of claim 37, wherein the at least one source of the plurality of sources is a femto node.

39. The computer program product of claim 38, wherein the computer-readable medium further comprises code for causing the at least one computer to receive the indication in one of the plurality of signals corresponding to the femto node.

40. The computer program product of claim 38, wherein the computer-readable medium further comprises code for causing the at least one computer to receive the indication over a backhaul connection with the femto node.

* * * * *